US007457702B2

(12) United States Patent
Takamatsu

(10) Patent No.: US 7,457,702 B2
(45) Date of Patent: Nov. 25, 2008

(54) ESTIMATED TORQUE CALCULATION DEVICE OF INTERNAL COMBUSTION ENGINE AND METHOD THEREOF

(75) Inventor: Hideki Takamatsu, Susono (JP)

(73) Assignee: Toyota Jidosha Kabsuhiki Kaisha, Aichi-ken (JP)

( * ) Notice: Subject to any disclaimer, the term of this patent is extended or adjusted under 35 U.S.C. 154(b) by 33 days.

(21) Appl. No.: 11/652,599

(22) Filed: Jan. 12, 2007

(65) Prior Publication Data

US 2007/0168106 A1 Jul. 19, 2007

(30) Foreign Application Priority Data

Jan. 18, 2006 (JP) ............................ 2006-009749

(51) Int. Cl.
*G06F 17/00* (2006.01)

(52) U.S. Cl. ...................................... 701/103; 701/110

(58) Field of Classification Search ................. 701/103, 701/110, 111, 114; 123/352; 477/54
See application file for complete search history.

(56) References Cited

U.S. PATENT DOCUMENTS 5,991,683 A * 11/1999 Takaoka et al. ............. 701/102
6,526,343 B2 * 2/2003 Saito et al. ..................... 701/51
6,678,605 B2 * 1/2004 Kisaka et al. ............... 701/111
6,701,246 B2 * 3/2004 Riedle et al. ................ 701/110
6,991,052 B2 * 1/2006 Nogi et al. ................. 180/65.2
2004/0128049 A1 7/2004 Kabe et al.

FOREIGN PATENT DOCUMENTS

JP 2005-120886 A 5/2005

* cited by examiner

*Primary Examiner*—Willis R. Wolfe, Jr.
*Assistant Examiner*—Johnny H. Hoang
(74) *Attorney, Agent, or Firm*—Sughrue Mion, PLLC

(57) ABSTRACT

An ECU executes the step S100 of detecting an intake air amount QA and an ignition timing IT, the step S200 of calculating an estimated engine torque TE from QA and IT, the step S300 of detecting the engine rotation speed NE and the turbine rotation speed NT, the step S400 of calculating the speed ratio E of the torque converter 210, the step S500 of calculating a torque capacity C from the speed ratio, the step S600 of calculating a reference torque TP(0) from the torque capacity C, the step S700 correcting the reference torque TP(0) into TP based on a map, the step S900 setting TE as the estimated engine torque if TP is greater than TE, and the step S1000 setting TP as the estimated engine torque if TP is not greater than TE.

12 Claims, 7 Drawing Sheets

FIG. 8

| | ENGINE ROTATION SPEED NE rpm | | | | |
|---|---|---|---|---|---|
| ENGINE COOLING WATER TEMPERATURE °C | | 500 | ... | ... | 2000 |
| | -40 | K(1) | | | |
| | ... | | | | |
| | ... | | | | |
| | ... | | | | |
| | ... | | | | |
| | ... | | | | |
| | ... | | | | |
| | 150 | | | | |

FIG. 9

| | ENGINE ROTATION SPEED NE rpm | | | | |
|---|---|---|---|---|---|
| ATF OIL TEMPERATURE °C | | 500 | ... | ... | 2000 |
| | -40 | K(2) | | | |
| | ... | | | | |
| | ... | | | | |
| | ... | | | | |
| | ... | | | | |
| | ... | | | | |
| | ... | | | | |
| | 150 | | | | |

ESTIMATED TORQUE CALCULATION DEVICE OF INTERNAL COMBUSTION ENGINE AND METHOD THEREOF

INCORPORATION BY REFERENCE

The disclosure of Japanese Patent Application No. 2006-009749 filed on Jan. 18, 2006 including the specification, drawings and abstract is incorporated herein by reference in its entirety.

BACKGROUND OF THE INVENTION

1. Field of the Invention

The invention relates to an estimated torque calculation device of an internal combustion engine and a method thereof. More particularly, the invention relates to a device and a method of precisely calculating an estimated torque generated by an internal combustion engine mounted in a vehicle.

2. Description of the Related Art

In conjunction with a vehicle equipped with an engine whose output torque can be controlled independently of the accelerator pedal operation of a driver and with an automatic transmission, there is a concept of "driving power control" that the positive/negative target driving torque calculated on the basis of the accelerator pedal operation amount of a driver, the operating condition of the vehicle, etc., is realized by the engine torque and the speed change gear ratio of the automatic transmission. Control techniques called "driving power request type", "driving power demand type", "torque demand system", etc. are also similar to this concept.

The aforementioned torque demand-system engine control device calculates a target torque of the engine on the basis of the accelerator operation amount, the engine rotation speed, and an external load, and controls the amount of fuel injection and the amount of supply air.

In this torque demand-system engine control device, in reality, a target generated torque is calculated by adding to the requested output torque a loss load torque, such as a friction torque, that forms the loss in the engine or the power train system, and the amount of fuel injection and the amount of supply air are controlled so as to realize the target generated torque.

According to this torque demand-system engine control device, improvements in the drivability, such as the ability to always maintain a constant operating feeling, etc., can be achieved by using the torque of the engine, which is a physical amount that directly affects the control of the vehicle, as a reference value of the control.

In the torque demand-system engine control device as described above, the torque generated from the engine is used as a target value to control the engine. Therefore, it is important how to estimate the torque generated from the engine.

Japanese Patent Application Publication No. JP-A-2005-120886, which relates to an air-fuel ratio control, discloses a control device of an internal combustion engine which highly accurately calculates an actual graphically-determined torque that is one of parameters that reflect the actual air-fuel ratio. This control device of an internal combustion engine includes an actual graphically-determined torque calculation portion that calculates an actual graphically-determined torque on the basis of information about the state of combustion during idle operation, a reference air-fuel ratio graphically-determined torque calculation portion that calculates a reference air-fuel ratio graphically-determined torque occurring at a reference air-fuel ratio on the basis of information about a physical amount of supply to the internal combustion engine during idle operation, and an estimated air-fuel ratio calculation portion that calculates an estimated value of the actual air-fuel ratio (hereinafter, referred to as "estimated air-fuel ratio") on the basis of the actual graphically-determined torque and the reference air-fuel ratio graphically-determined torque.

According to this control device of an internal combustion engine, during idle operation, the actual graphically-determined torque can be calculated on the basis of the information about the state of combustion since the vehicle drive system is not driven. The thus-calculated actual graphically-determined torque serves as a parameter that accurately reflects the actual air-fuel ratio of the mixture actually burned in the cylinders. Therefore, the use of the actual graphically-determined torque and the reference air-fuel ratio graphically-determined torque makes it possible to find a relationship the actual air-fuel ratio and the reference air-fuel ratio, from which the actual air-fuel ratio can be estimated (i.e., an estimated air-fuel ratio can be calculated). In this case, as a concrete calculation method for the actual graphically-determined torque, an actual graphically-determined torque may be found by calculating a mechanical friction loss on the basis of information about the engine rotation speed and the engine temperature (e.g., the cooling water temperature), and calculating a pumping loss on the basis of the intake pipe pressure, and calculating an external load torque on the basis of the state of operation of accessories, and summing the mechanical friction loss, the pumping loss and the external load torque. During idle operation, the actual graphically-determined torque is a value obtained by summing the internal loss torque (the mechanical friction loss and the pumping loss) and the external load torque (the load torque of accessories such as the compressor of the air-conditioner and the like). Therefore, the mechanical friction loss, the pumping loss, the external load torque can be accurately calculated, and the actual graphically-determined torque obtained by summing these values can be accurately calculated.

However, in a relatively high rotation speed region, the intake system and the combustion system are relatively stable, and therefore the state of operation of the internal combustion engine stabilizes. On the other hand, in a low rotation speed region, the state of operation of the internal combustion engine does not stabilize, due to the tendency for the intake system and the combustion system to become unstable and furthermore, the intervention of the ISC (Idle Speed Control) and the increases in the load output of the internal combustion engine. Therefore, even if the torque of the internal combustion engine is estimated by factoring in the losses and the external load in the low rotation speed region, there is possibility of deterioration of the estimation accuracy in the low rotation speed region.

However, the aforementioned Japanese Patent Application Publication No. JP-A-2005-120886 does not mention the accuracy deterioration regarding the estimated torque of the internal combustion engine in the low rotation speed region.

SUMMARY OF THE INVENTION

It is an object of the invention to provide an estimated torque calculation device of an internal combustion engine which is capable of calculating an estimated torque of the internal combustion engine highly accurately, regardless of the load region of the internal combustion engine.

An estimated torque calculation device in accordance with a first aspect of the invention calculates an estimated torque of an internal combustion engine mounted in a vehicle. This calculation device includes: a first torque calculation portion that calculates an output torque of the internal combustion engine as a first output torque based on a load of the internal combustion engine; a second torque calculation portion that calculates the output torque of the internal combustion engine as a second output torque based on a map in which a rotation speed of the internal combustion engine is a parameter; a numerical value calculation portion that calculates a numerical value based on a characteristic of a torque converter connected to the internal combustion engine; and a setting portion that sets one of the first output torque and the second output torque as the estimated torque based on the numerical value.

According to this construction, using the numerical value based on the characteristic of the torque converter connected to the internal combustion engine, the estimated torque calculation device discriminates states of operation of the internal combustion engine, for example, into a first operation region and a second operation region. The first operation region is a region in which the intake system and the combustion system are relatively stable. In this region, the first output torque estimated on the basis of the load of the internal combustion engine is set as the estimated torque. The second operation region is a region in which the intake system and the combustion system are not relatively stable (idle region, or the like). In this region, the second output torque estimated on the basis of the map in which the rotation speed of the internal combustion engine is a parameter is set as the estimated torque. Therefore, in the second region in particular, even if the state of operation of the internal combustion engine is not relatively stable, an estimated torque is calculated through the use of a map prepared beforehand, not on the basis of the actual load of the internal combustion engine. Hence, the accuracy of the estimated torque of the internal combustion engine in the second region becomes high. As a result, an estimated torque calculation device of an internal combustion engine which is capable of calculating an estimated torque of the internal combustion engine highly accurately, regardless of the load region of the internal combustion engine can be provided.

The first torque calculation portion may calculate the output torque of the internal combustion engine based on an intake air amount and an ignition timing of the internal combustion engine.

According to this construction, in a region where the intake system and the combustion system are relatively stable, that is, the aforementioned first operation region, the output torque of the internal combustion engine can be highly accurately estimated on the basis of the throttle opening degree and the ignition timing of the internal combustion engine.

The second torque calculation portion may calculate the output torque of the internal combustion engine based on a map in which the rotation speed of the internal combustion engine and a temperature of the internal combustion engine are parameters.

According to this construction, in a region where the intake system and the combustion system are not relatively stable, that is, the aforementioned second operation region, the output torque of the internal combustion engine can be highly accurately estimated on the basis of the map in which the rotation speed of the internal combustion engine and the temperature of the internal combustion engine are parameters.

The second torque calculation portion may calculate the output torque of the internal combustion engine based on a map in which the rotation speed of the internal combustion engine and a temperature of a working oil of an automatic transmission connected to the internal combustion engine via the torque converter are parameters.

According to this construction, in the region where the intake system and the combustion system are not relatively stable, that is, the aforementioned second operation region, the output torque of the internal combustion engine can be highly accurately estimated on the basis of the map in which the rotation speed of the internal combustion engine and the temperature of the working oil of the automatic transmission are parameters.

The second torque calculation portion may calculate the output torque of the internal combustion engine based on a map in which the rotation speed of the internal combustion engine and a temperature of the internal combustion engine are parameters, and a map in which the rotation speed of the internal combustion engine and a temperature of a working oil of an automatic transmission connected to the internal combustion engine via the torque converter are parameters.

According to this construction, in the region where the intake system and the combustion system are not relatively stable, that is, the aforementioned second operation region, the output torque of the internal combustion engine can be estimated with even higher accuracy.

The numerical value calculation portion may calculate a pump torque rotating an input shaft of the torque converter based on a torque capacity of the torque converter and the rotation speed of the internal combustion engine.

According to this construction, the pump torque of the torque converter is calculated, and the use of the pump torque makes it possible to discriminate between the first operation region and the second operation region.

The setting portion may compare the pump torque and the first output torque calculated based on the load of the internal combustion engine, and if the pump torque is greater, the setting portion may set the first output torque as the estimated torque, and if the pump torque is equal to or less than the first output torque, the setting portion may set the second output torque as the estimated torque.

According to this construction, if the pump torque is greater than the first output torque, the present operation region is discriminated as the first operation region, and the first output torque is set as the estimated torque. If the pump torque is equal to the first output torque or if the pump torque is less than the first output torque, the present operation region is discriminated as the second operation region, and the second output torque is set as the estimated torque. Thus, the pump torque and the first output torque are compared, and the result of the comparison is used for the aforementioned discrimination between the operation regions of the internal combustion engine, and an estimated torque that matches either one of the operation regions can be calculated.

The intake air amount may be detected by an air flow meter, or may also be detected based on a throttle opening degree.

A second aspect of the invention relates to an estimated torque calculation device that calculates an estimated torque of an internal combustion engine. This device includes: a first torque calculation portion that calculates an output torque of the internal combustion engine as a first output torque based on a load of the internal combustion engine; a second torque calculation portion that calculates the output torque of the internal combustion engine as a second output torque based on a map in which a rotation speed of the internal combustion engine is a parameter; and a setting portion that sets one of the first output torque and the second output torque as the estimated torque based on a state of operation of the internal combustion engine.

In this construction, the estimated torque calculation device may further include a numerical value calculation portion that calculates a numerical value based on a characteristic of a torque converter connected to the internal combustion engine, wherein the setting portion sets one of the first output torque and the second output torque as the estimated torque based on the numerical value.

The setting portion may set one of the first output torque and the second output torque as the estimated torque based on an output rotation speed of the internal combustion engine.

The setting portion may set one of the first output torque and the second output torque as the estimated torque based on a throttle opening degree.

In an estimated torque calculation method of an internal combustion engine in accordance with a third aspect of the invention, an output torque of the internal combustion engine is calculated as a first output torque based on a load of the internal combustion engine; the output torque of the internal combustion engine is calculated as a second output torque based on a map in which a rotation speed of the internal combustion engine is a parameter; a numerical value based on a characteristic of a torque converter connected to the internal combustion engine is calculated; and one of the first output torque and the second output torque is set as the estimated torque based on the numerical value.

In the foregoing method, the first output torque may be calculated based on an intake air amount and an ignition timing of the internal combustion engine.

In the foregoing method, the second output torque may be calculated based on a map in which the rotation speed of the internal combustion engine and a temperature of the internal combustion engine are parameters.

In the foregoing method, the second output torque may be calculated based on a map in which the rotation speed of the internal combustion engine and a temperature of a working oil of an automatic transmission connected to the internal combustion engine via the torque converter are parameters.

In the foregoing method, the second output torque may be calculated based on a map in which the rotation speed of the internal combustion engine and a temperature of the internal combustion engine are parameters, and a map in which the rotation speed of the internal combustion engine and a temperature of a working oil of an automatic transmission connected to the internal combustion engine via the torque converter are parameters.

In the foregoing method, a pump torque for rotating an input shaft of the torque converter may be calculated based on a torque capacity of the torque converter and the rotation speed of the internal combustion engine.

In the foregoing method, the pump torque and the first output torque may be compared, and if the pump torque is greater, the first output torque may be set as the estimated torque, and if the pump torque is equal to or less than the first output torque, the second output torque may be set as the estimated torque.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 8 is a view showing a correction coefficient K(1) map; and

FIG. 9 is a view showing a correction coefficient K(2) map.

DETAILED DESCRIPTION OF THE PREFERRED EMBODIMENTS

Figure 1:
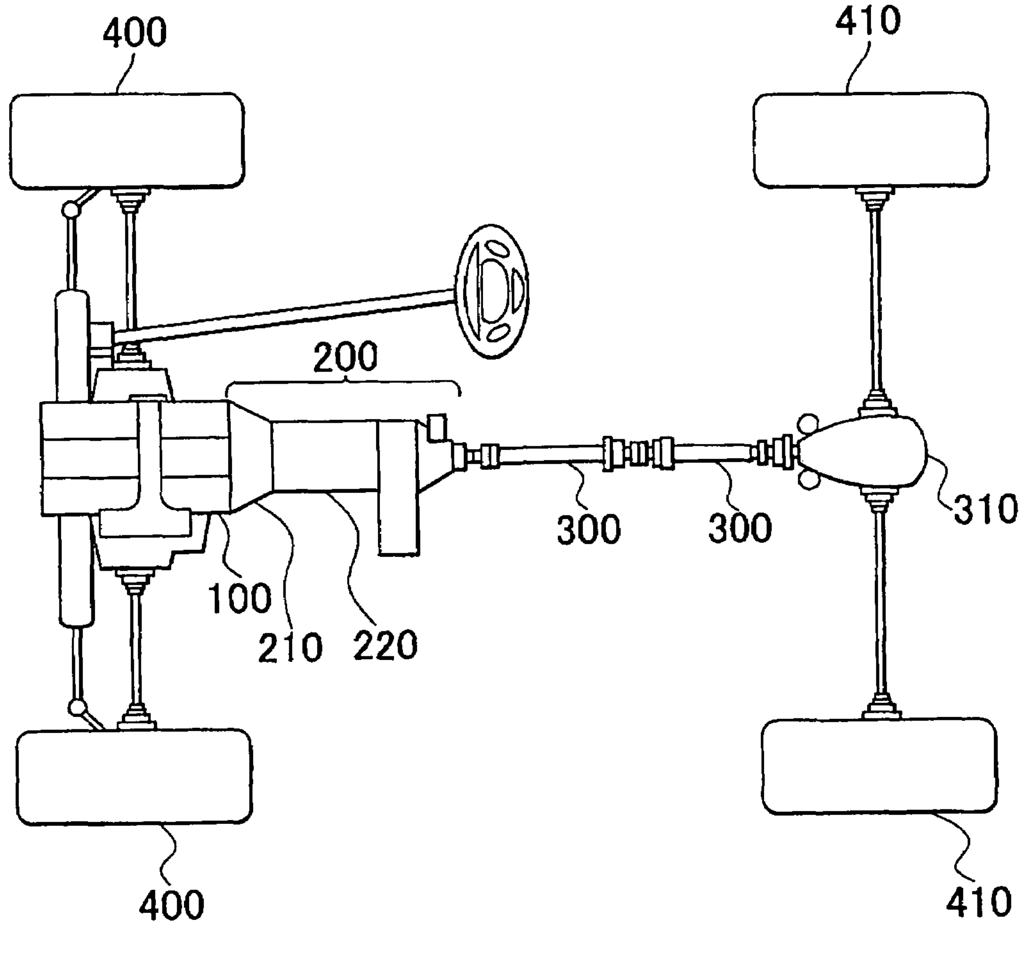
FIG. 1 is a diagram showing a power train of a vehicle to which a estimated torque calculation device of an internal combustion engine in accordance with an embodiment of the invention is applied.

Embodiments of the invention will be described hereinafter with reference to the drawings. In the following description, the reference characters are affixed to the same component parts. The names and functions of those component parts are all the same. Therefore, detailed description thereof will not be repeated.

With reference to FIG. 1, a constitution of a vehicle to which an estimated torque calculation device of an internal combustion engine in accordance with an embodiment will be described. This estimated torque calculation device is realized by programs that are executed by an ECU (Electronic Control Unit) on the basis of signals input from an internal combustion engine 100, an automatic transmission 200, etc.

As shown in FIG. 1, the vehicle to which the estimated torque calculation device is applied has, as a drive source, the internal combustion engine 100 that is mounted in a front portion of the vehicle. The driving power thereof is transmitted to driving wheels 410 via the automatic transmission 200, propeller shafts 300, and a differential gear 310. The vehicle is also equipped with driven wheels 400 that are operated by a steering mechanism to steer the vehicle.

Incidentally, in this embodiment, the vehicle to which the estimated torque calculation device of the internal combustion engine is applied in the aforementioned manner is a vehicle that has an FR (Front-Engine Rear-Wheel Drive) power train. However, the invention is not applied exclusively to the vehicles that have such a power train.

Figure 2:
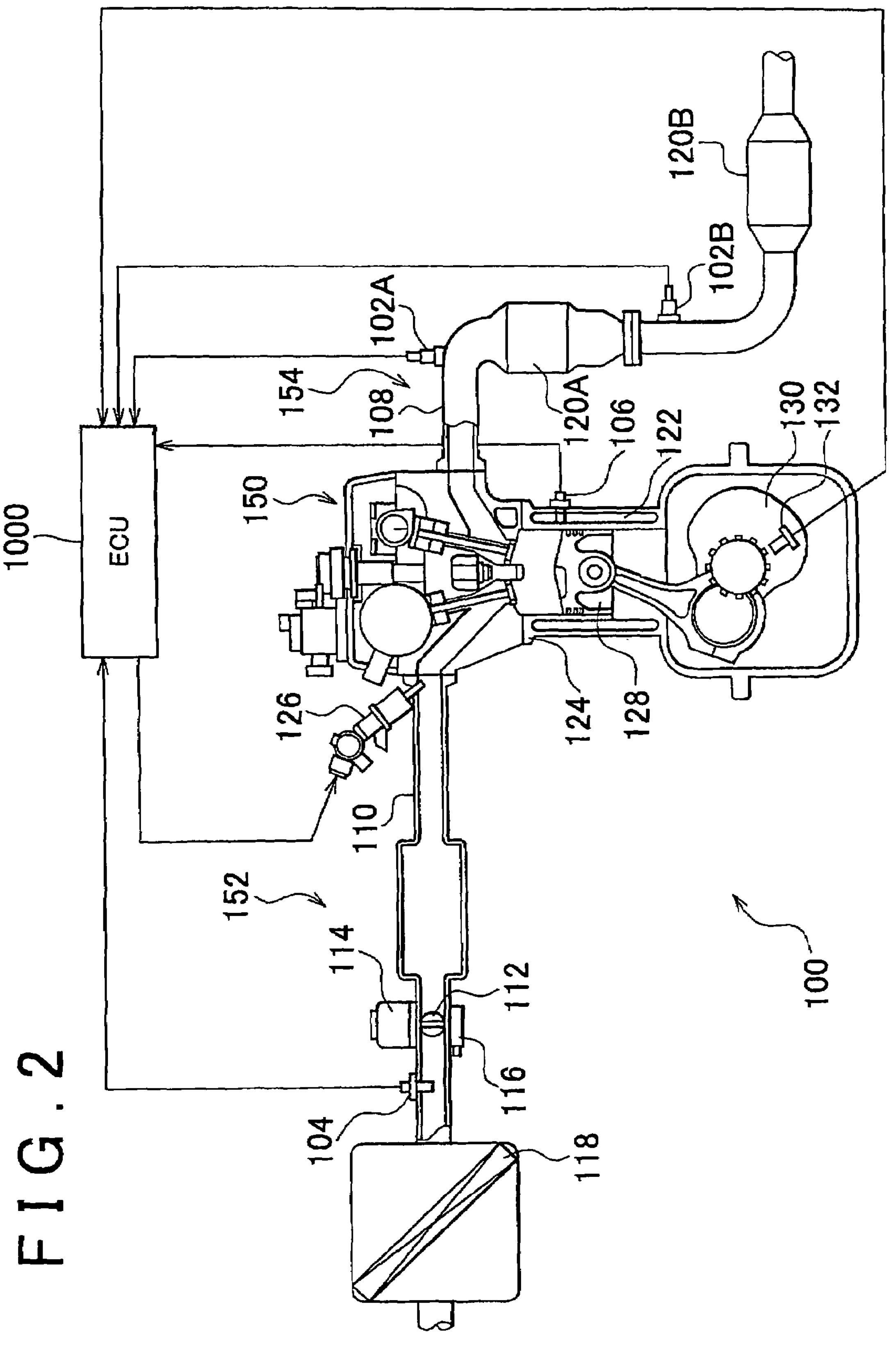
FIG. 2 is a schematic construction diagram of an internal combustion engine.

The internal combustion engine 100 shown in FIG. 1 will be described in detail with reference to FIG. 2. The internal combustion engine 100 includes an internal combustion engine body 150, an intake system 152, an exhaust system 154, and the ECU 1000 that mainly controls the internal combustion engine 100.

The intake system 152 includes an intake passageway 110, an air cleaner 118, an air flow meter 104, a throttle motor 114, a throttle valve 112, and a throttle position sensor 116.

The air take in via the air cleaner 118 passes through the intake passageway 110, and flows into the internal combustion engine body 150. The throttle valve 112 is provided in an intermediate portion of the intake passageway 110. The throttle valve 112 is opened and closed by operating the throttle motor 114. At this time, the degree of opening of the throttle valve 112 can be detected by the throttle position sensor 116. The intake passageway between the air cleaner 118 and the throttle valve 112 is provided with the air flow meter 104, which detects the amount of air taken in. The air flow meter 104 sends an intake air amount signal that represents the intake air amount QA to the ECU 100. The intake air amount may be found on the basis of the throttle opening degree.

The internal combustion engine body 150 includes a cooling water passageway 122, a cylinder block 124, injectors 126, pistons 128, a crankshaft 130, a water temperature sensor 106, and a crank position sensor 132.

Cylinders whose number corresponds to the cylinder number of the cylinder block 124 are provided. Each cylinder contains one of the pistons 128. Since the cylinders have substantially the same construction, the following description will be made sometimes in conjunction with an arbitrary one of the cylinders. A mixture of taken-in air and fuel injected from the injector 126 is introduced through the intake passageway 110 into a combustion chamber above the piston 128, and burns upon ignition by an ignition plug (not shown). As the combustion occurs, the piston 128 is pushed down. At this time, the up-down movements of the piston 128 are converted into rotary motion of the crankshaft 130 via a crank mechanism. The rotation speed NE of the internal combustion engine body 150 is detected by the ECU 1000 on the basis of the signal that is detected by the crank position sensor 132.

The cooling water passageway 122 is provided within the cylinder block 124. In the cooling water passageway 122, cooling water is circulated by operation of a water pump (not shown). The cooling water in the cooling water passageway 122 flows to a radiator (not shown) connected to the cooling water passageway 122, and is caused to release heat by a cooling fan (not shown). The water temperature sensor 106 is provided on a passageway of the cooling water passageway 122, and detects the temperature of the cooling water in the cooling water passageway 122. The water temperature sensor 106 sends the detected water temperature as a water temperature signal to the ECU 1000.

The exhaust system 154 includes an exhaust passageway 108, a first air-fuel ratio sensor 102A, a second air-fuel ratio sensor 102B, a first three-way catalyst converter 120A, and a second three-way catalyst converter 120B. The first air-fuel ratio sensor 102A is provided at an upstream side of the first three-way catalyst converter 120A, and the second air-fuel ratio sensor 102B is provided at a downstream side of the first three-way catalyst converter 120A (an upstream side of the second three-way catalyst converter 120B). It is also allowable to provide only one three-way catalyst.

The internal combustion engine body 150 is equipped with an ISC control that is executed by the ECU 1000. The ISC control adjusts the degree of opening of the throttle valve 112 so that the internal combustion engine 100 does not stall during an idle state.

In this vehicle, a requested torque for the internal combustion engine 100 is calculated from the accelerator pedal depression degree, the cruise control, the TRC (Traction Control System), etc., and the internal combustion engine 100 is controlled so as to generate the requested torque by the ECU 1000.

Figure 3:
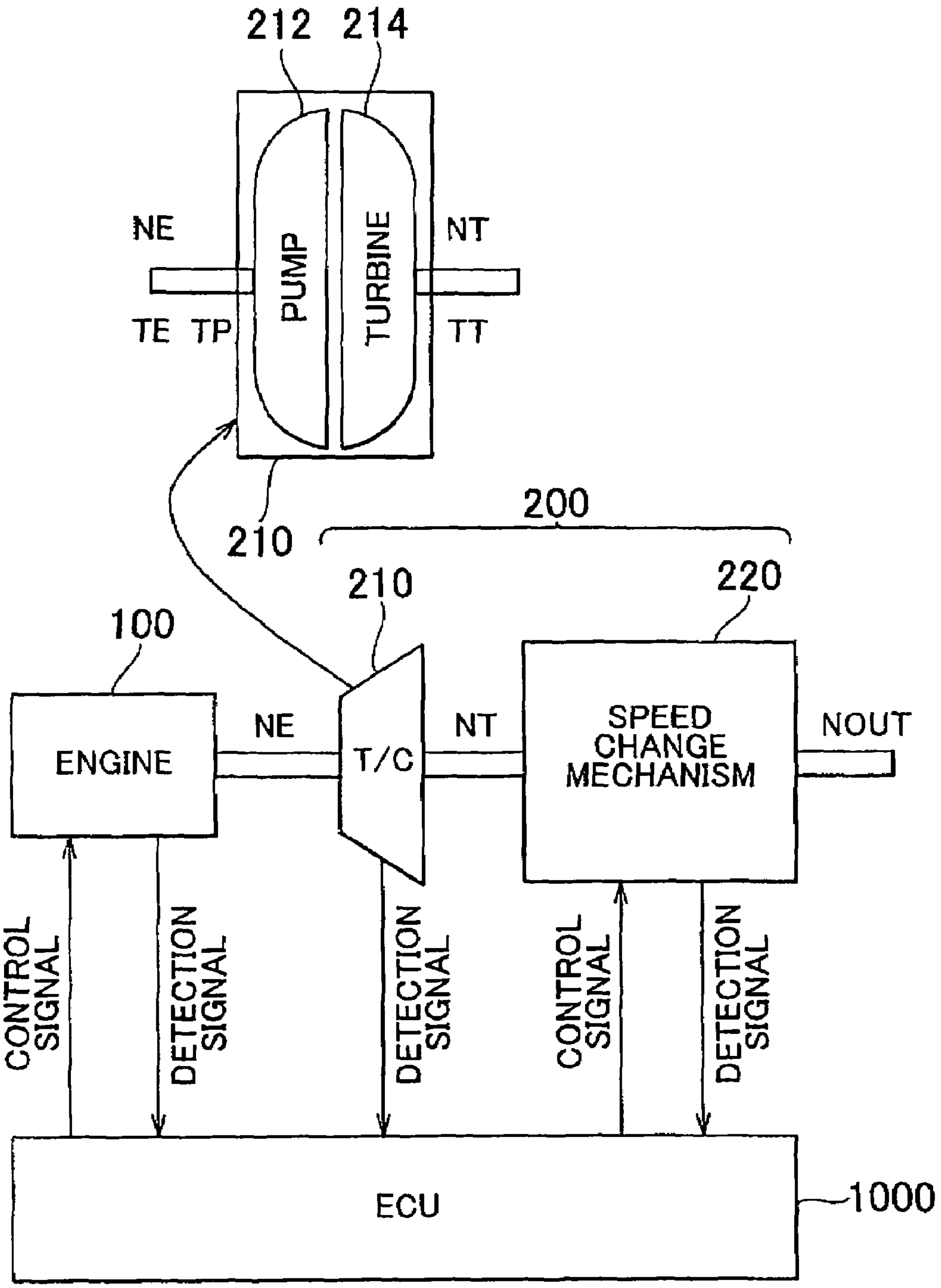
FIG. 3 is a control block diagram of a power train.

FIG. 3 illustrates the power train of the vehicle to which the estimated torque calculation device of the internal combustion engine in accordance with this embodiment is applied.

As shown in FIG. 3, this vehicle includes the internal combustion engine 100, the automatic transmission 200 (a torque converter 210 and a speed change mechanism 220), and the ECU 1000 that controls these components, as described above. To the ECU 1000, a signal showing the degree of depression of the accelerator pedal is input from an accelerator pedal depression degree sensor, and a signal from a brake switch (i.e., a switch that detects that the foot brake is depressed) is input, as well as other signals.

The automatic transmission 200 is constructed of the torque converter 210 that is a fluid coupling, and a speed change mechanism that is one of (1) a gear stepped speed change mechanism, (2) a belt stepless speed change mechanism, and (3) a traction stepless speed change mechanism. The following description will be made on the assumption that the speed change mechanism 220 is a gear speed change mechanism.

The torque converter 210 that is a fluid coupling is constructed of a pump 212 (pump impeller) that is a member on an internal combustion engine 100 side, and a turbine 214 (turbine runner) that is a member on a speed change mechanism 220 side. The structure of the torque converter 210 is a common structure, and the detailed description thereof is omitted herein.

In this description, the rotation speed of the internal combustion engine 100 is mentioned with NE (hereinafter, mentioned as "engine rotation speed" or "engine rotation speed NE" or simply as "NE"), and the torque of the internal combustion engine 100 is mentioned with TE (hereinafter, mentioned as "engine torque" or "engine torque TE" or simply as "TE"), and the input shaft-side torque of the torque converter 210 is mentioned with TP (hereinafter, mentioned as "pump torque" or "pump torque TP" or simply as "TP"), and the output shaft rotation speed of the torque converter 210 is mentioned with NT (hereinafter, mentioned as "turbine rotation speed" or "turbine rotation speed NT" or simply as "NT"), and the output shaft torque of the torque converter 210 is mentioned with TT (hereinafter, mentioned as "turbine torque" or "turbine torque TT" or simply as "TT"), and the output shaft rotation speed of the automatic transmission 200 is mentioned with NOUT (hereinafter, mentioned as "output shaft rotation speed" or "output shaft rotation speed NOUT" or simply as "NOUT"). Besides, the gear ratio of the speed change mechanism is the turbine rotation speed NT/output shaft rotation speed NOUT. In addition, TP, that is, the input shaft-side torque of the torque converter 210 is the torque that is needed in order to rotate the input shaft. Furthermore, even where the engine torque is simply mentioned, the term means an estimated engine torque since the engine torque cannot be directly detected by a sensor.

Figure 4:
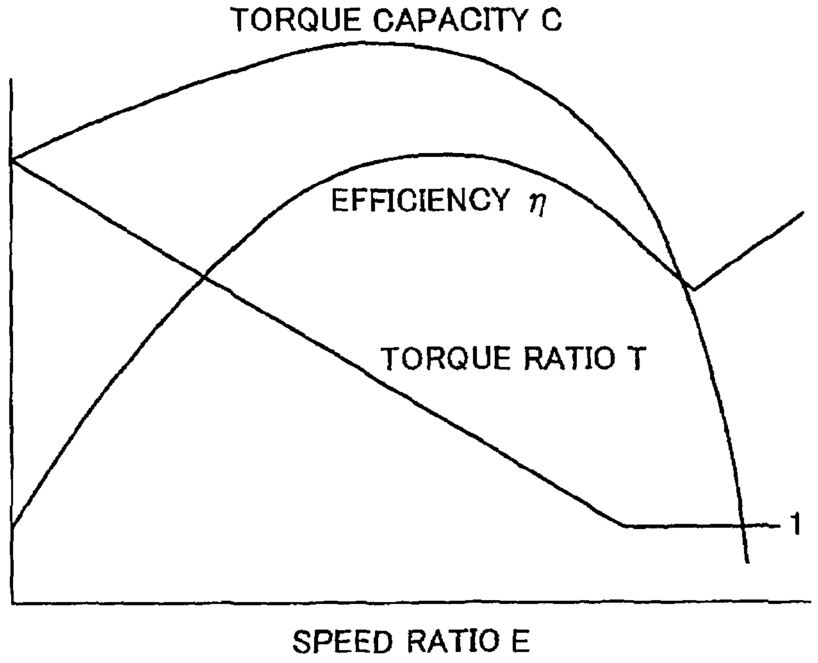
FIG. 4 is a diagram showing characteristic curves of a torque converter.

FIG. 4 shows characteristic curves of the torque converter 210. Specifically, FIG. 4 shows characteristic performances of a common torque converter. In FIG. 4, the horizontal axis indicates the speed ratio E (=NT/NE), and the vertical axis indicates the torque ratio T, the efficiency $\eta$, and the torque capacity C. Incidentally, the torque ratio T=TT/TE, the efficiency $\eta$=output shaft horse power/input shaft horse power, and the torque capacity $C=TP/NE^2$.

The rotation speed NE and the turbine rotation speed NT of the internal combustion engine 100 are detected by rotation speed sensors, and a speed ratio E is calculated therefrom. Using the characteristic curves of the torque converter 210 shown in FIG. 4, the torque capacity C at the speed ratio E is calculated on the basis of the speed ratio E. Since the torque capacity C and the engine rotation speed NE are calculated, the pump torque TP can be calculated as in $TP=C\cdot NE^2$.

Figure 5:
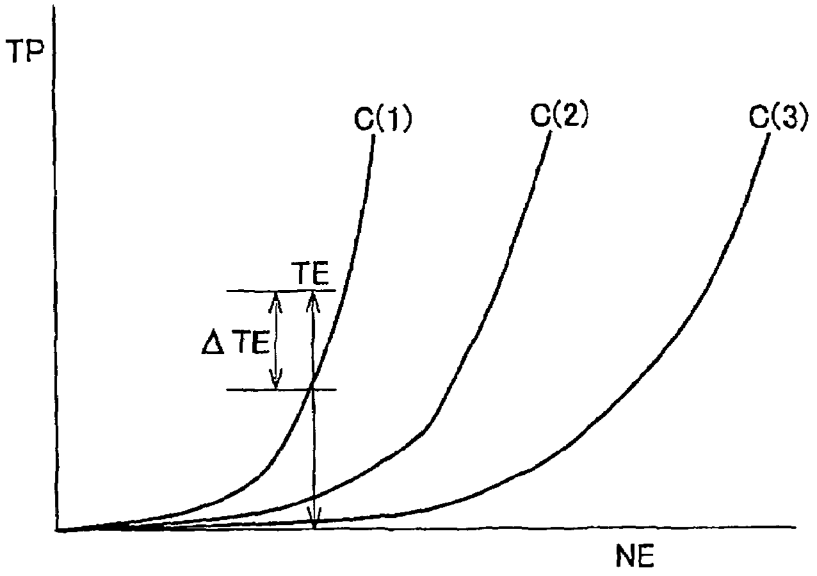
FIG. 5 is a diagram showing relationships between the engine rotation speed NE and the pump torque TP.

In FIG. 5, relationships between the engine rotation speed (NE) and the pump torque (TP) are represented with the torque capacity C being a parameter. As shown in FIG. 5, the relationship between the engine rotation speed and the pump torque changes depending on the torque capacity C. The case where the torque capacity is C(1) in FIG. 5 (i.e., the case where the torque capacity C calculated on the basis of the speed ratio E through the use of the diagram of FIG. 4 is C(1))

will be described. The ECU 1000 calculates the engine torque TE that the internal combustion engine 100 outputs, manly on the basis of the intake air amount QA and the ignition timing. If the engine torque TE has a magnitude of TE indicated in FIG. 5 in the case where the torque capacity C is C(1), the amount ΔTE is a torque that is not transmitted to driving wheel side of the torque converter 210.

In the estimated torque calculation device of the internal combustion engine in accordance with this embodiment, the estimation method used to estimate the torque of the internal combustion engine 100 is changed on the basis of the magnitude relationship between TP and TE. A reason for this is as follows. In a high rotation speed region of the internal combustion engine 100, the intake system and the combustion system of the internal combustion engine 100 are relatively stable, and therefore the state of operation of the internal combustion engine 100 is stabilized. Hence, the engine torque TE output by the internal combustion engine 100 which is calculated mainly on the basis of the intake air amount QA and the ignition timing is highly accurate. On the other hand, in a low rotation speed region, the state of operation of the internal combustion engine 100 does not stabilize, due to the tendency for the intake system and the combustion system to become unstable and, furthermore, the intervention of the ISC (Idle Speed Control) and changes in the load output of the internal combustion engine. Therefore, the engine torque TE output by the internal combustion engine 100 which is calculated mainly on the basis of the intake air amount QA and the ignition timing is poorly accurate. Hence, the low rotation speed region is defined as a region of TP<TE, in which TE is calculated by a different method described below, instead of calculating the engine torque TE output by the internal combustion engine 100 on the basis of the intake air amount QA and the ignition timing.

Figure 6:
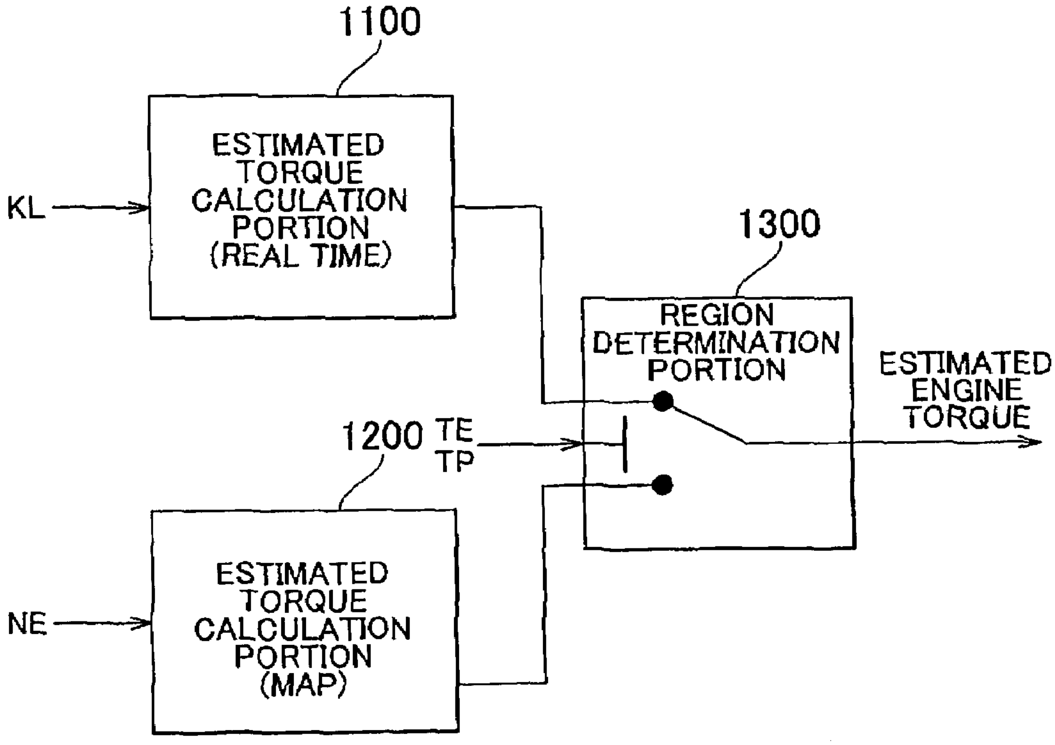
FIG. 6 is a block diagram of the estimated torque calculation device of the internal combustion engine in accordance with the embodiment.

With reference to FIG. 6, a block diagram of the estimated torque calculation device of the internal combustion engine in accordance with this embodiment will be described.

The estimated torque calculation device of the internal combustion engine includes a first estimated torque calculation portion (real time) 1100, a second estimated torque calculation portion (map) 1200, and a region determination portion 1300 that determines whether the present region is a region that requires selection of the estimated torque calculation portion (real time) 1100 or a region that requires selection of the estimated torque calculation portion (map) 1200 on the basis of the magnitude relationship between TE and TP. These portions are realized by programs that are executed by the ECU 1000.

The first estimated torque calculation portion (real time) 1100 estimates and calculates the engine torque output by the internal combustion engine 100, on the basis of the load KL (or the load factor KL) (mainly, on the basis of the intake air amount QA and ignition timing mentioned above).

The second estimated torque calculation portion (map) 1200 calculates speed ratio E of the torque converter 210 on the basis of the engine rotation speed NE, and calculates the torque capacity C from the speed ratio E, and then calculates a reference estimated torque TP(0) through $TP=C\cdot NE^2$. By correcting the reference estimated torque TP(0), the second estimated torque calculation portion (map) 1200 estimates and calculates the engine torque output by the internal combustion engine 100.

The region determination portion 1300, if TP>TE, outputs a result of the calculation by the estimated torque calculation portion (real time) 1100 as an estimated engine torque. If TP<TE, the portion 1300 outputs a result of the calculation by the estimated torque calculation portion (map) 1200 as an estimated engine torque.

Figure 7:
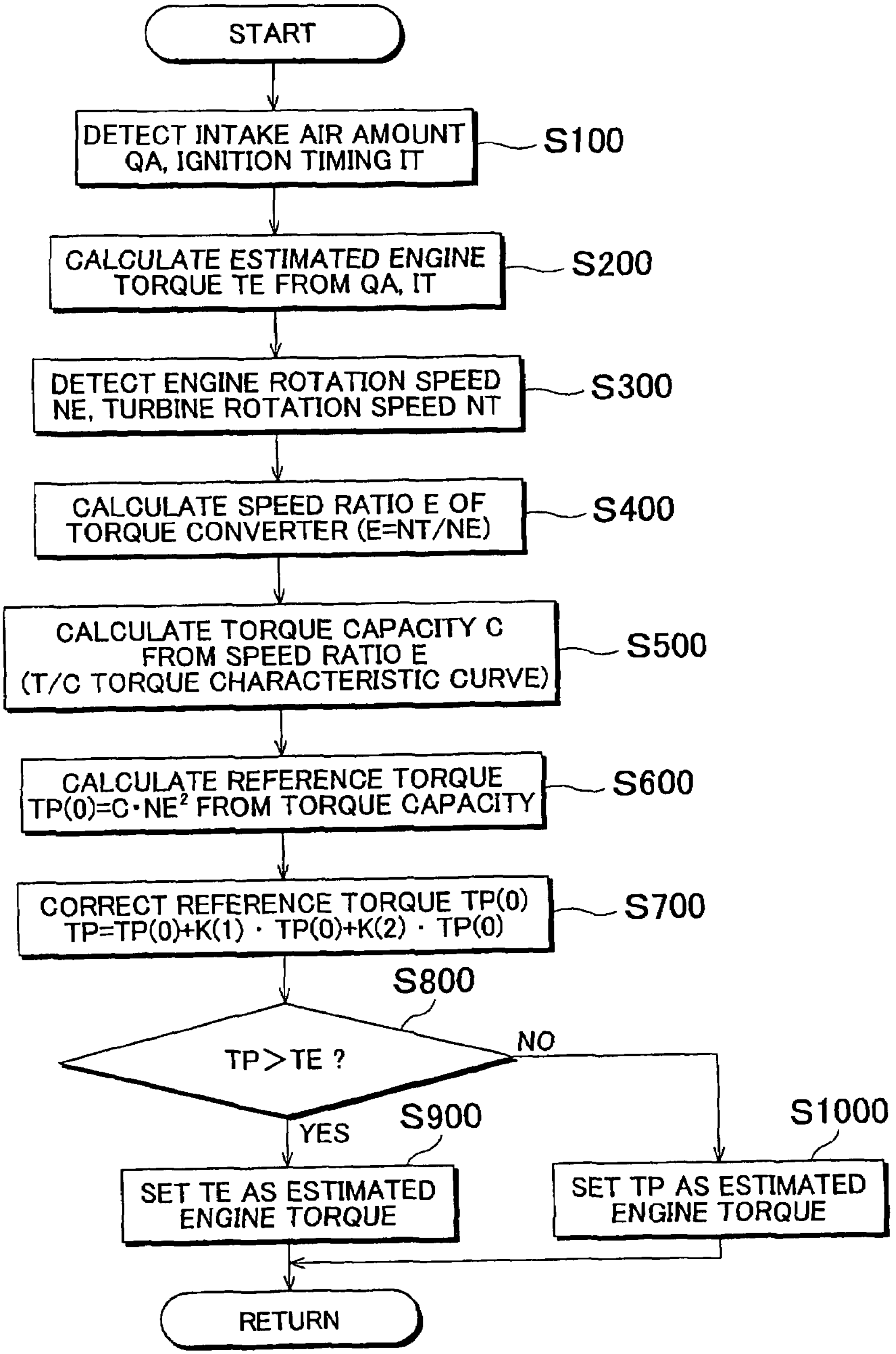
FIG. 7 is a flowchart showing a control structure of a program executed by an ECU that is the estimated torque calculation device of the internal combustion engine in accordance with the embodiment.

With reference to a flowchart shown in FIG. 7, a control structure of a program executed by the ECU 1000 will be described. The program shown in this flowchart is repeatedly executed with a predetermined cycle time.

In step (hereinafter, mentioned as "S") 100, the ECU 1000 detects the intake air amount QA and the ignition timing IT.

In S200, the ECU 1000 calculates the estimated engine torque TE on the basis of the detected intake air amount QA and the detected ignition timing IT. In this process, a parameter other than the intake air amount QA and the ignition timing IT may also be added.

In S300, the ECU 1000 detects the engine rotation speed NE and the turbine rotation speed NT.

In S400, the ECU 1000 calculates the speed ratio E (=NT/NE) of the torque converter 210 on the basis of the detected engine rotation speed NE and the detected turbine rotation speed NT.

In S500, the ECU 1000 calculates the torque capacity C from the speed ratio E of the torque converter 210. At this time, a characteristic curve of the torque converter 210 as shown in FIG. 4 is used.

In S600, the ECU 1000 calculates the reference torque TP(0) ($=C\cdot NE^2$) from the torque capacity C of the torque converter 210.

In S700, the ECU 1000 corrects the calculated reference torque TP(0). At this time, the reference torque TP(0) is corrected by TP=TP(0)+K(1)·TP(0)+K(2)·TP(0). Incidentally, the correction coefficient K(1) is determined from a map of the cooling water temperature and the engine rotation speed NE of the internal combustion engine 100 as shown in FIG. 8. Besides, the correction coefficient K(2) is determined from a map of the working oil temperature and the engine rotation speed NE of the automatic transmission 200 as shown in FIG. 9.

In S800, the ECU 1000 judges whether or not the pump torque TP is greater than the engine torque TE. If the pump torque TP>the engine torque TE holds (YES in S800), the process proceeds to S900. If not (NO in S800), the process proceeds to S1000.

In S900, the ECU 1000 sets TE as an estimated engine torque. In S1000, the ECU 1000 sets TP as an estimated engine torque.

An operation of the estimated torque calculation device of the internal combustion engine in accordance with this embodiment based on the structure and the flowchart described above will be described.

Firstly, the case where the shift position is the D position, and the accelerator is off, and the brake is on (idle-on) is assumed. Specifically, the case where the vehicle is at a stop on a flat road with the automatic transmission in the D position, and where the accelerator pedal is not depressed, and where the brake pedal is depressed is assumed.

In such an idle-on case, the internal combustion engine 100 operates at or near an idle rotation speed due to the ISC control, and the turbine rotation speed NT is 0. Therefore, the speed ratio E=0 is calculated (S400), and the torque capacity C is calculated (S500).

In the idle-on case, the engine rotation speed NE is low, and therefore the value calculated through TP(0)$=C\cdot NE^2$ (S600) and TP=TP(0)+K(1)·TP(1)+K(2)·TP(2) (S700) is small.

Hence, TP≦TE holds (NO in S800), so that TP is set as an estimated engine torque (S1000). Since TP has been corrected by the engine cooling water temperature (the map shown in FIG. 8) and the working oil temperature of the automatic transmission (the map shown in FIG. 9), and the correction coefficients K(1) and K(2) based on a map determined by the engine rotation speed NE, high accuracy is achieved as the estimated engine torque.

Also assumed is the case of the D position and the idle-off. Specifically, in the case where the vehicle is ordinarily running or the case where the vehicle is running on an uphill road, the engine rotation speed NE is high, and therefore the value calculated through the TP(0)=C·NE$^2$ (S600) and TP=TP(0)+K(1)·TP(1)+K(2)·TP(2) (S700) is large.

Hence, TP>TE holds (YES in S800), so that TE is set as an estimated engine torque (S1000). TE has been calculated on the basis of the intake air amount QA and the ignition timing IT. In the region of TP>TE, the intake system and the combustion system of the internal combustion engine 100 are relatively stable, and therefore the state of operation of the internal combustion engine 100 is stabilized. Therefore, although the value calculated on the basis of the intake air amount QA and the ignition timing, the value is highly accurate as the estimated engine torque.

According to the estimated torque calculation device of the internal combustion engine in accordance with the embodiment, one of TP and TE is selectively set as an the estimated engine torque on the basis of the magnitude relationship between the pump torque TP and the engine torque TE. Furthermore, TP is processed so that the estimation accuracy will heighten even in the idle-on state, on the basis of the correction coefficient K(1) based on the map of the engine rotation speed and the engine cooling water temperature, and the correction coefficient K(2) based on the map of the engine rotation speed and the working oil temperature of the automatic transmission. Therefore, regardless of the load region of the internal combustion engine, the estimated torque of the internal combustion engine can be highly accurately calculated.

Incidentally, in the process of S700, it is also allowable to use only one of K(1) and K(2).

In the process of S800, it is also allowable to compare TP(0) and TE. The process of S800 may also be designed so that if the engine rotation speed NE is in the high rotation speed region, the process of S900 will be executed, and if not, the process of S1000 will be executed. Furthermore, the process of S800 may also be designed so that if the throttle opening degree, instead of the engine rotation speed NE, is in a large throttle opening degree region, the process of S900 will be executed, and if not, the process of S1000 will be executed.

It should be understood that the embodiments disclosed herein are, in all respects, merely exemplary and not restrictive. The scope of the invention is shown not by the foregoing description but by the claims for patent, and is intended to include all the modifications that are within the meaning and scope equivalent to those of the claims for patent.

What is claimed is:

1. An estimated torque calculation device that calculates an estimated torque of an internal combustion engine, comprising:

a first torque calculation portion that calculates an output torque of the internal combustion engine as a first output torque based on a load of the internal combustion engine;

a second torque calculation portion that calculates the output torque of the internal combustion engine as a second output torque based on a map in which a rotation speed of the internal combustion engine is a parameter;

a numerical value calculation portion that calculates a numerical value based on a characteristic of a torque converter connected to the internal combustion engine; and a setting portion that sets one of the first output torque and the second output torque as the estimated torque based on the numerical value;

wherein the numerical value calculation portion calculates a pump torque rotating an input shaft of the torque converter based on a torque capacity of the torque converter and the rotation speed of the internal combustion engine;

wherein the setting portion compares the pump torque and the first output torque, and wherein if the pump torque is greater, the setting portion sets the first output torque as the estimated torque, and wherein if the pump torque is equal to or less than the first output torque, the setting portion sets the second output torque as the estimated torque.

2. The estimated torque calculation device according to claim 1, wherein the first torque calculation portion calculates the first output torque based on an intake air amount and an ignition timing of the internal combustion engine.

3. The estimated torque calculation device according to claim 1, wherein the second torque calculation portion calculates the second output torque based on a map in which the rotation speed of the internal combustion engine and a temperature of the internal combustion engine are parameters.

4. The estimated torque calculation device according to claim 1, wherein the second torque calculation portion calculates the second output torque based on a map in which the rotation speed of the internal combustion engine and a temperature of a working oil of an automatic transmission connected to the internal combustion engine via the torque converter are parameters.

5. The estimated torque calculation device according to claim, 1, wherein the second torque calculation portion calculates the second output torque based on a map in which the rotation speed of the internal combustion engine and a temperature of the internal combustion engine are parameters, and a map in which the rotation speed of the internal combustion engine and a temperature of a working oil of an automatic transmission connected to the internal combustion engine via the torque converter are parameters.

6. The estimated torque calculation device according to claim 2, wherein the intake air amount is detected by an air flow meter.

7. The estimated torque calculation device according to claim 2, wherein the intake air amount is detected based on a throttle opening degree.

8. A estimated torque calculation method that calculates an estimated torque of an internal combustion engine, comprising:

calculating an output torque of the internal combustion engine as a first output torque based on a load of the internal combustion engine;

calculating the output torque of the internal combustion engine as a second output torque based on a map in which a rotation speed of the internal combustion engine is a parameter;

calculating a numerical value based on a characteristic of a torque converter connected to the internal combustion engine; and setting one of the first output torque and the second output torque as the estimated torque based on the numerical value;

wherein a pump torque for rotating an input shaft of the torque converter is calculated based on a torque capacity of the torque converter and the rotation speed of the internal combustion engine;

wherein the pump torque and the first output torque are compared, and wherein if the pump torque is greater, the first output torque is set as the estimated torque, and wherein if the pump torque is equal to or less than the first output torque, the second output torque is set as the estimated torque.

9. The estimated torque calculation method according to claim 8, wherein the first output torque is calculated based on an intake air amount and an ignition timing of the internal combustion engine.

10. The estimated torque calculation method according to claim 8, wherein the second output torque is calculated based on a map in which the rotation speed of the internal combustion engine and a temperature of the internal combustion engine are parameters.

11. The estimated torque calculation method according to claim 8, wherein the second output torque is calculated based on a map in which the rotation speed of the internal combustion engine and a temperature of a working oil of an automatic transmission connected to the internal combustion engine via the torque converter are parameters.

12. The estimated torque calculation method according to claim 8, wherein the second output torque is calculated based on a map in which the rotation speed of the internal combustion engine and a temperature of the internal combustion engine are parameters, and a map in which the rotation speed of the internal combustion engine and a temperature of a working oil of an automatic transmission connected to the internal combustion engine via the torque converter are parameters.

* * * * *

UNITED STATES PATENT AND TRADEMARK OFFICE

CERTIFICATE OF CORRECTION

PATENT NO. : 7,457,702 B2
APPLICATION NO. : 11/652599
DATED : November 25, 2008
INVENTOR(S) : Hideki Takamatsu It is certified that error appears in the above-identified patent and that said Letters Patent is hereby corrected as shown below:

Title Page, item [73] Assignee: ~~Toyota Jidosha Kabsuhiki Kaisha, Aichi-ken (JP)~~ should read --Toyota Jidosha Kabushiki Kaisha, Aichi-ken (JP)--

Signed and Sealed this

Third Day of March, 2009

JOHN DOLL
*Acting Director of the United States Patent and Trademark Office*